United States Patent
Ikemoto (10) Patent No.: US 9,470,027 B2
(45) Date of Patent: Oct. 18, 2016

(54) VEHICLE CONTROL APPARATUS

(71) Applicant: Mitsubishi Electric Corporation, Chiyoda-ku, Tokyo (JP)

(72) Inventor: Minoru Ikemoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/758,674

(22) PCT Filed: Apr. 24, 2013

(86) PCT No.: PCT/JP2013/062132
§ 371 (c)(1),
(2) Date: Jun. 30, 2015

(87) PCT Pub. No.: WO2014/174624
PCT Pub. Date: Oct. 30, 2014

(65) Prior Publication Data
US 2015/0337581 A1   Nov. 26, 2015

(51) Int. Cl.
*B60R 11/02* (2006.01)
*E05D 7/10* (2006.01)
(Continued)

(52) U.S. Cl.
CPC ......... *E05D 13/003* (2013.01); *B60R 11/0264* (2013.01); *E05D 7/105* (2013.01);
(Continued)

(58) Field of Classification Search
CPC ..... B60R 7/06; B60R 11/02; B60R 11/0264; B60R 11/0258; B60R 11/0252; B60R 11/027; B60R 2011/001; B60R 2011/0094; B60R 2011/0288; B60R 2011/0294; E05D 3/02; E05D 7/105; E05D 7/1044; E05D 2007/1088; E05D 13/003; E05Y 2900/00; E05Y 2900/53; E05Y 2900/544

USPC ............. 296/37.1, 37.8, 24.43, 37.12, 24.39, 296/24.34, 70
See application file for complete search history.

(56) References Cited

U.S. PATENT DOCUMENTS 2,677,147 A   5/1954   Phillips
6,070,297 A   6/2000   Borer
(Continued)

FOREIGN PATENT DOCUMENTS

DE   297 11 491 U1   9/1997
JP   51-82222   7/1976
(Continued)

OTHER PUBLICATIONS

International Search Report (PCT/ISA/210) mailed on Jul. 30, 2013, by the Japanese Patent Office as the International Searching Authority for International Application No. PCT/JP2013/062132.
(Continued)

*Primary Examiner* — Gregory Blankenship
(74) *Attorney, Agent, or Firm* — Buchanan Ingersoll & Rooney PC (57) ABSTRACT

A vehicle control apparatus is housed within a housing. A cover covers an opening in the housing. Connecting members connect the cover and the housing. A shaft supporting section of each connecting member supports a shaft. A first extending section extends from a bearing in a direction orthogonal to the shaft. The first extending section and the bearing are rotatable with respect to the shaft supporting section. A stopper is not adjacent to the first extending section in the shaft direction when the first extending section is within a first angle range with respect to the shaft supporting section. The stopper is disposed at a position of sandwiching, with the shaft supporting section, the extending section in the shaft direction by being adjacent to the first extending section in the shaft direction, when the first extending section is within a second angle range with respect to the shaft supporting section.

7 Claims, 7 Drawing Sheets

(51) Int. Cl.
*E05D 3/02* (2006.01)
*E05D 13/00* (2006.01)

(52) U.S. Cl.
CPC .............. *E05D 7/1044* (2013.01); *E05D 3/02* (2013.01); *E05D 2007/1088* (2013.01); *E05Y 2900/00* (2013.01); *E05Y 2900/53* (2013.01); *E05Y 2900/544* (2013.01)

(56) References Cited

U.S. PATENT DOCUMENTS

| | | | | |
|---|---|---|---|---|
| 6,244,647 | B1* | 6/2001 | Allison | B60R 7/06 296/37.1 |
| 7,219,940 | B2* | 5/2007 | Huang | B60R 11/00 248/121 |
| 7,686,364 | B2* | 3/2010 | Hehn | B60R 7/04 220/812 |
| 7,984,942 | B2* | 7/2011 | Schaupensteiner | E05B 83/30 292/33 |
| 2007/0205334 | A1* | 9/2007 | Kim | B60R 11/02 248/27.1 |
| 2009/0200825 | A1* | 8/2009 | Shimajiri | B60N 2/4686 296/37.8 |
| 2011/0084106 | A1* | 4/2011 | Bopp | B60R 11/0252 224/563 |
| 2014/0347796 | A1* | 11/2014 | Isquierdo | B60K 35/00 361/679.01 |
| 2015/0145271 | A1* | 5/2015 | Ankolikar | E05D 15/502 296/37.8 |
| 2015/0337581 | A1* | 11/2015 | Ikemoto | E05D 7/105 49/381 |

FOREIGN PATENT DOCUMENTS

| | | |
|---|---|---|
| JP | 58-116461 U | 8/1983 |
| JP | 8-270300 A | 10/1996 |
| JP | 9-30413 A | 2/1997 |
| JP | 2008-38953 A | 2/2008 |

OTHER PUBLICATIONS

Written Opinion (PCT/ISA/237) mailed on Jul. 30, 2013, by the Japanese Patent Office as the International Searching Authority for International Application No. PCT/JP2013/062132.

Extended European Search Report dated Mar. 30, 2016, issued by the European Patent Office in the corresponding European Application No. 13883227.4. (7 pages).

Canadian Office Action dated Jun. 28, 2016, issued in corresponding Canadian Patent Appln. No. 2,898,085 (4 pages).

* cited by examiner

VEHICLE CONTROL APPARATUS

TECHNICAL FIELD

The present disclosure relates to a vehicle control apparatus.

BACKGROUND ART

A vehicle control apparatus for supplying electric power to mounted equipment is provided in vehicles of railway and/or the like. This vehicle control apparatus is housed in a housing provided with an opening, and through this opening maintenance and/or the like is accomplished. In order to protect the vehicle control apparatus from rain, dust and/or the like, the opening of the housing is typically covered by a cover.

This kind of housing is provided below the floor or on the roof, and/or the like, of the vehicle. In many cases, there is limited work space below the floor or on the roof, so being able to open and close the cover in a smaller space is desired. Hence, in the vehicle control apparatus, a removable cover is utilized. So as to not interfere with work, this cover is removed from the housing when maintenance work is being accomplished on the vehicle control apparatus and is attached after the work is completed.

Removing and attaching the cover is for example accomplished by the cover being screwed into the housing, and by removing or retightening a screw, bolt and/or the like.

However, when the cover is screwed into the housing, removing and retightening the screw and/or the like is troublesome. In order to quickly and surely accomplish the removal and reattachment work, Patent Literature 1 for example discloses an attachment anchoring apparatus for a vehicle covering board (hereafter referred to as a cover) that is provided with a shaft whose thickness differs depending on the direction and a bearing that includes a cylinder in which a notch larger than the minimum thickness of the shaft is formed.

In this attachment anchoring apparatus, two of the above-described shafts are disposed at both sides on the top edge of the cover, and are anchored by fasteners so that the tips of each shaft face the center side of the edge. Bearings corresponding to these shafts are disposed more toward the edge center on the cover than are the shaft fasteners.

The attachment anchoring apparatus according to Patent Literature 1 uses a structure in which the two shafts sandwich the corresponding bearings from both sides, so the cover is not removed when shifted left or right. In addition, by causing the shaft to rotate to an orientation indicating the minimum thickness, a relationship is achieved in which the position of the shaft and the notch in the bearing coincide, so that the shaft and bearing separate and it is possible to remove the cover.

CITATION LIST

Patent Literature

Patent Literature 1: Unexamined Japanese Patent Application Kokai Publication No. H9-30413.

SUMMARY OF INVENTION

Technical Problem

However, with the attachment anchoring apparatus disclosed in Patent Literature 1, not only are the two shafts on both sides of the top edge of the cover rotated in a specific direction of rotation, these shafts must be simultaneously disposed at the positions of the notches in the bearings corresponding thereto. At this time, not only must the shafts and the notches in the bearings become parallel, it is necessary for the tips of the shafts to be simultaneously positioned at prescribed positions (for example, the ends) of the bearings corresponding thereto. Consequently, removing and attaching the cover is not simple, and requires time and effort.

In consideration of the foregoing, it is an objective of the present disclosure to prevent falling of the cover while making removing and attaching easy, in a vehicle control apparatus.

Solution to Problem

In order to achieve the above objective, a vehicle control apparatus according to a first aspect of the present disclosure is provided with a housing, a cover, and connecting members. The housing is mounted on a vehicle and houses the vehicle control apparatus to control a vehicle. The cover covers an opening that is provided in the housing. Each of the connecting members connects the cover and the housing to each other such that the opening can be opened and closed by the cover, and has a first shaft supporting section, a second shaft supporting section and an extending section. The first supporting section is connected to either the housing or the cover and supports a shaft. The second supporting section is adjacent to the first supporting section in the direction of the shaft and supports the shaft. The extending section extends from the second supporting section in a direction orthogonal to the shaft and is connected to the other of the housing or the cover. At least one out of the first supporting section and the second supporting section rotatably supports the shaft, and the extending section and the second supporting section are rotatable with respect to the first supporting section. At least one out of the first supporting section and the second supporting section enables insertion and removal of the shaft. The connecting member further comprises a stopper. The stopper is not adjacent to the extending section in the direction of the shaft when the extending section is in a first angle range with respect to the first supporting section in a state in which the shaft is inserted into at least one out of the first supporting section and the second supporting section and the first supporting section and the second supporting section are adjacent, and is disposed at a position adjacent to the extending section in the direction of the shaft and sandwiches, with the first supporting section, the extending section in the direction of the shaft, when the extending section is in a second angle range with respect to the first supporting section.

Advantageous Effects of Invention

With the present disclosure, in cases where an extending section is within a first angle range with respect to a first supporting section in a vehicle control apparatus, a stopper is not adjacent to the extending section, so it is possible to remove and reattach the cover. Because the cover can be removed and reattached depending on the angle formed by the extending section and the first supporting section, with the present disclosure removing and reattaching the cover is easy. In addition, in cases where the extending section is within a second angle range with respect to the first supporting section, the stopper is adjacent to the extending section and is disposed at a position sandwiching, with the first supporting section, the extending section in the direction of the shaft, so the cover is prevented from falling off.

DESCRIPTION OF EMBODIMENTS

Below, exemplary embodiments of the present disclosure are described in detail with reference to the drawings. In the drawings, portions that are the same or equivalent are labeled with the same reference symbols.

First Exemplary Embodiment

Figure 1:
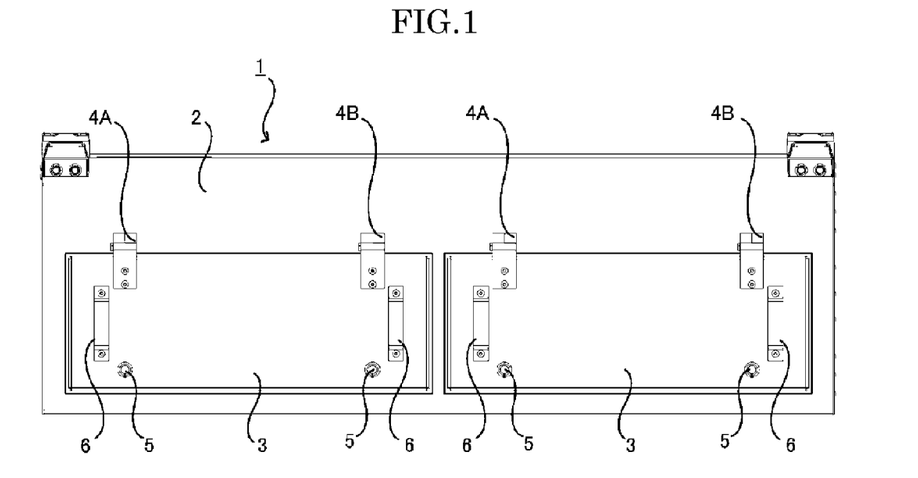
FIG. 1 is a frontal view showing a vehicle control apparatus according to an exemplary embodiment of the present disclosure.

FIG. 1 is a frontal view showing a vehicle control apparatus according to a first exemplary embodiment of the present disclosure. The vehicle control apparatus 1 shown in FIG. 1 is a control apparatus for controlling the supply of electric power to equipment (also called vehicle equipment) mounted on a railway vehicle and/or the like. The vehicle control apparatus 1 is provided with a housing 2 and a cover 3.

The housing 2 is a case in the shape of a rectangular solid mounted on the vehicle for housing the vehicle control apparatus 1. The housing 2 is disposed under the floor of the vehicle, and an opening 21 (see FIG. 2) for inspecting or removing the control apparatus housed inside the housing 2 is formed in the side surface of the housing 2. The cover 3 is attached to the housing 2, and the opening 21 is covered by the cover 3. The cover 3 is supported by connecting members 4A and 4B so as to be able to open and close the opening 21.

The cover 3 is made of a rectangular plate-shaped member and the top edge side is openable and closable on a shaft. As explained below, the cover 3 is opened and closed by raising the bottom side, and in addition can be removed from the opening 21 of the housing 2.

Figure 2:
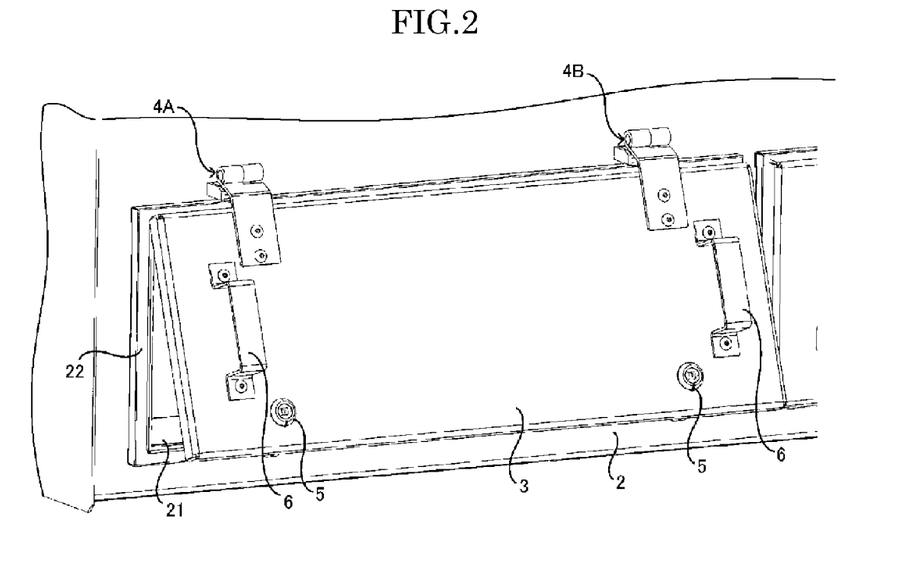
FIG. 2 is an oblique view showing an enlargement of an cover section when the cover of the vehicle control apparatus is opened.
Figure 3:
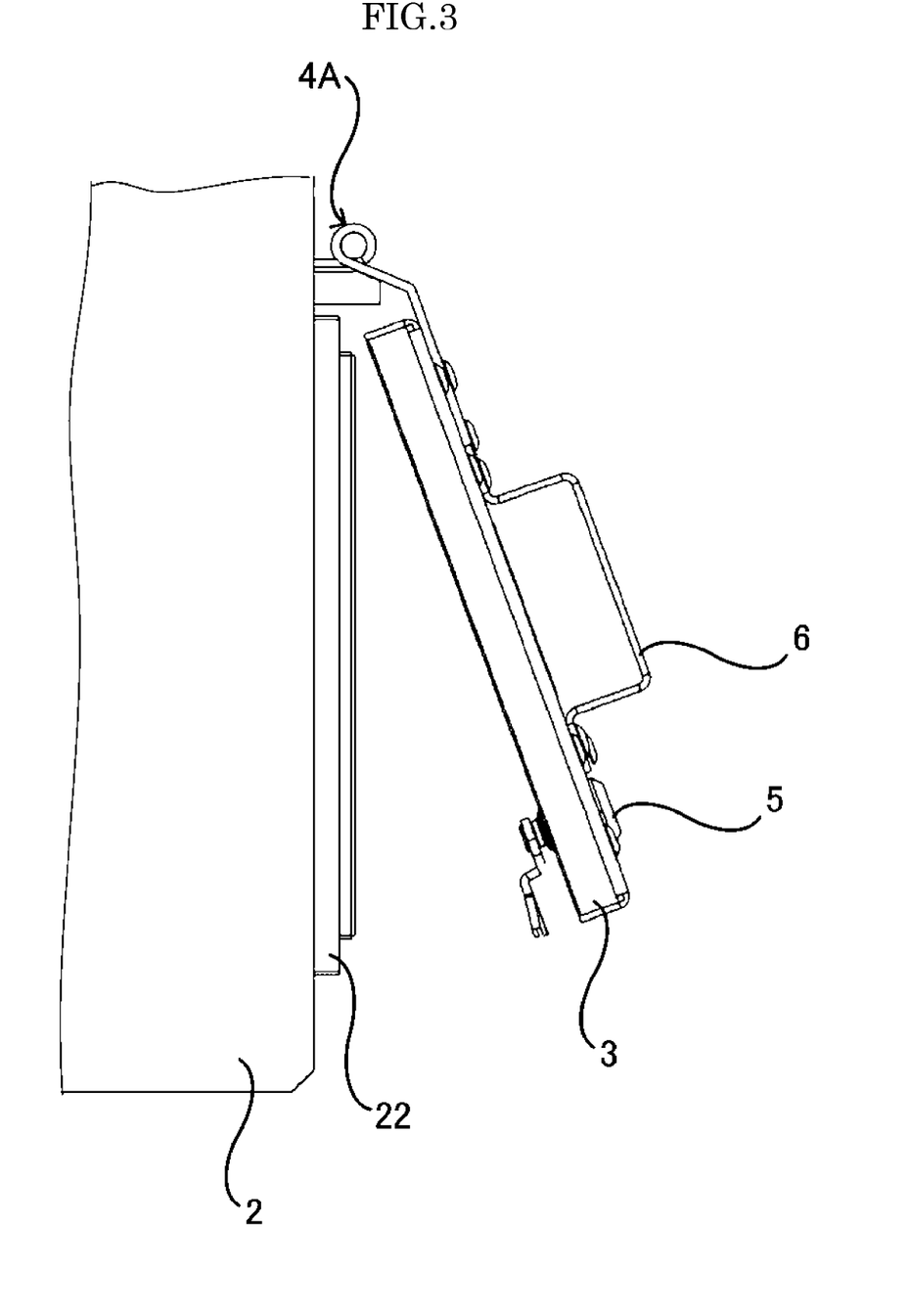
FIG. 3 is a side view showing an enlargement of the cover section when the cover of the vehicle control apparatus is opened.

FIG. 2 is an oblique view showing an enlargement of an cover section when the cover of the vehicle control apparatus is opened. FIG. 3 is a side view showing an enlargement of the cover section when the cover of the vehicle control apparatus is opened. The cover 3 shown in FIG. 2 and FIG. 3 covers the opening 21 formed in the housing 2 and the framework 22 thereof. The cover 3 is supported on the housing 2 by the connecting members 4A and 4B such that the cover 3 can open and close and is removable, and is provided with a latch 5 and a handle 6.

The latch 5 is a fastener or clasp for anchoring the cover 3 to the housing 2. The latch 5 includes a rotation shaft and an engagement member coupled with the rotation shaft, and the cover 3 is anchored to the housing 2 by this engagement member engaging with the framework 22 of the housing 2.

The handle 6 is a member protruding from the cover 3 and provided so as to make it possible to easily open and close the cover 3. Opening and closing of the cover 3 is possible by pulling the handle 6 toward the user and raising the bottom edge side of the cover 3, with the engagement member of the latch 5 in a disconnected state.

The connecting members 4A and 4B are members that connect the housing 2 and the cover 3 and enable the cover 3 to open and close the opening 21 and to be removed. For example, these are members called hinges or hinge joints. More specifically, the connecting members 4A and 4B are disposed so as to be lined up collinearly on the top edge of the cover 3 facing in a horizontal direction, and connect the cover 3 and the housing 2 near the top side of the framework 22.

Figure 4:
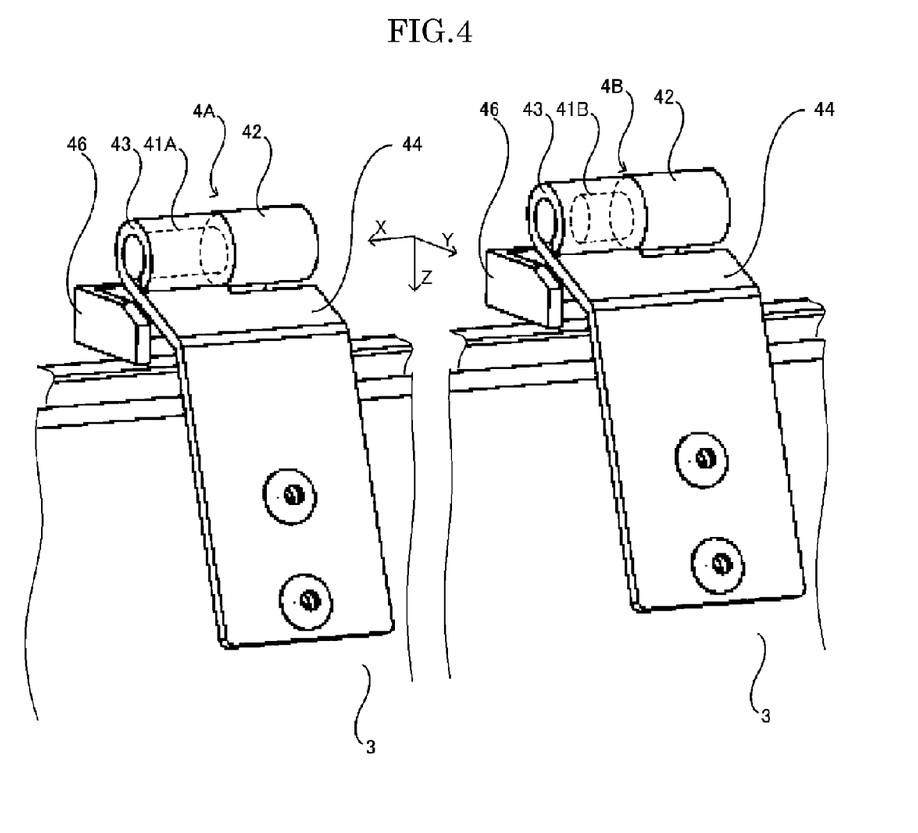
FIG. 4 is an oblique view showing an enlargement of a connecting member section when the cover of the vehicle control apparatus is opened.

FIG. 4 is an oblique view showing an enlargement of a connecting member section when the cover of the vehicle control apparatus is opened. The connecting members 4A and 4B shown in FIG. 4 include a shaft supporting section 42, shafts 41A and 41B, a bearing 43, a first extending section 44 and a stopper 46.

The shaft supporting section 42 is a member for supporting the shafts 41A and 41B, and for example a columnar member formed integrally with the shafts 41A and 41B or a columnar or cylindrical member into which the shafts 41A and 41B are interlocked and anchored correspond to this. In the connecting members 4A and 4B shown in FIG. 4, a cylindrical member is utilized as the shaft supporting section 42. Specifically, the shaft supporting section 42 is formed in a cylindrical shape and one end of the shafts 41A and 41B is inserted into the center of the cylinder. The shafts 41A and 41B are anchored by the inside of the cylinder. A housing anchoring section is provided on the side surface of the cylinder of the shaft supporting section 42, and the shaft supporting section 42 is connected to the housing 2 by the housing anchoring section. The shafts 41A and 41B are anchored to the housing 2 via the shaft supporting section 42.

The shafts 41A and 41B are column-shaped bars, and the length thereof varying depending on the connecting member. That is to say, of the multiple connecting members 4A and 4B, at least one of the connecting members has a shaft longer than the other connecting member thereof. For example, the shaft 41A of the connecting member 4A is longer than the shaft 41B of the connecting member 4B. Through this, when attaching the cover 3, attachment is possible starting with the shaft 41A of the connecting member 4A, as described below. The shafts 41A and 41B are inserted into the bearing 43, and the bearing 43 is adjacent to the cylinder of the shaft supporting section 42 in the shaft direction of the shafts 41A and 41B.

The bearing 43 is a cylindrical member like the shaft supporting section 42. The bearing 43 supports the shafts 41A and 41B and also enables insertion and removal of the shafts 41A and 41B. That is to say, the bearing 43 has a hole into which the shafts 41A and 41B are inserted, and with the shafts 41A and 41B inserted therein, is capable of rotating with respect to the shaft supporting section 42. For example, the bearing 43 is formed in a cylindrical shape and in the cylinder thereof an insertion hole is formed the inner diameter of which is substantially the same size as the shafts 41A and 41B. The first extending section 44 is disposed so as to extend along the side surface of the cylinder of the bearing 43.

The first extending section 44 is a member for connecting the bearing 43 to the cover 3, and is formed so as to extend in a direction orthogonal to the shaft direction of the cylinder from the cylinder side surface of the bearing 43. For example, the first extending section 44 is formed integrally with the bearing 43 and therein is formed a screw hole for anchoring to the cover 3. For example, the first extending section 44 and the bearing 43 are formed of plate-shaped materials (for example, sheet metal). At one end, the cylindrical bearing 43 formed by bending the plate-shaped material is disposed, and at the other end, the first extending section 44 in which the screw hole for anchoring to the cover 3 is formed is disposed so as to protrude from the cylinder of the bearing 43. The protruding portion is planar and the tip thereof is bent so as to follow the shape of the cover 3.

The first extending section 44 is a single body with the bearing 43, and thus is capable of rotating with respect to the shaft supporting section 42 in a state in which the shafts 41A and 41B are inserted into the bearing 43. The shafts 41A and 41B are disposed near the top side of the framework 22 encompassing the opening 21, so the cover 3 connected to the first extending section 44 can open and close in the center of the top side of the opening 21. When the cover 3 closes the opening 21, a stopper 46 is adjacent to the first extending section 44 in the sideways direction (the X direction shown in FIG. 4).

The stopper 46 is a fall-preventing tool that prevents the first extending section 44 and the bearing 43 from moving in the shaft direction of the shafts 41A and 41B (the X direction shown in FIG. 4; hereafter referred to simply as the shaft direction) and thereby falling from the shafts 41A and 41B. For example, the stopper 46 is a plate-shaped structure having an L-shaped cross-section, with one end connected to the shaft supporting section 42 and the other end disposed on the side surface of the first extending section 44. The stopper 46 is adjacent to the first extending section 44 in the shaft direction and restricts movement in the shaft direction.

One end of the stopper 46 is anchored to the housing 2. Because the shaft supporting section 42 is anchored to the housing 2, the stopper 46 is anchored to the shaft supporting section 42 via the housing 2. The anchoring position thereof is a position that does not interfere with the bearing 43. For example, the position is outside of the side surface of the column of the bearing 43 (for example, the downward side of the column, the Z direction shown in FIG. 4). For example, this one end is positioned such that the plate-shaped portion thereof is along the surface of the housing 2.

The other end of the stopper 46 bends from the above-described one end and extends in a direction orthogonal to the shaft direction of the shafts 41A and 41B. Specifically, the stopper 46 includes a plate-shaped section extending in a direction substantially parallel to the column bottom surface of the bearing 43. When the opening 21 is closed by the cover 3, this plate-shaped section is adjacent to the first extending section 44 in the shaft direction and is disposed at a position sandwiching the first extending section 44 with the shaft supporting section 42. Below, the relationship between opening and closing of the cover 3 and the stopper 46 is described.

Figure 5:
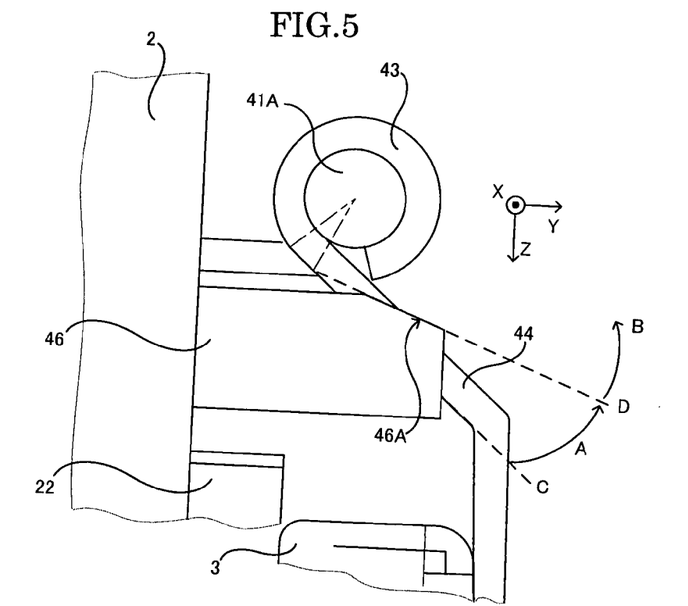
FIG. 5 is a side view showing an enlargement of the connecting member section when the cover of the vehicle control apparatus is closed.

FIG. 5 is a side view showing an enlargement of the connecting member section when the cover of the vehicle control apparatus is closed. When the cover 3 is in a closed state, that is to say when the first extending section 44 is at an angle C shown in FIG. 5 with respect to the shaft supporting section 42, the stopper 46 shown in FIG. 5 is adjacent to the first extending section 44 in the shaft direction. Consequently, the first extending section 44 is restricted in movement in the shaft direction by the stopper 46. In contrast, the bearing 43 formed integrally with the first extending section 44 is adjacent to the shaft supporting section 42 in the shaft direction. Consequently, the bearing 43 is restricted in movement in the shaft direction by the shaft supporting section 42. Accordingly, when the cover 3 is in a closed state, the first extending section 44 and the bearing 43 are sandwiched by the shaft supporting section 42 and the stopper 46, and cannot be removed in the shaft direction. That is to say, the first extending section 44 and the bearing 43 do not fall from the shaft 41A.

When the cover 3 is opened from the state shown in FIG. 5, the bearing 43 and the first extending section 44 rotate with respect to the shaft supporting section 42 and the first extending section 44 rotates to an angle D shown in FIG. 5 with respect to the shaft supporting section 42 (below, the angle formed by the first extending section 44 with respect to the shaft supporting section 42 is referred to as the open angle of the first extending section 44), the first extending section 44 becomes adjacent to a guide surface 46A that is disposed the tip of the stopper 46. At this time, the stopper 46 is not adjacent to the first extending section 44 so that movement of the bearing 43 in the shaft direction is not restricted. Furthermore, when the bearing 43 and first extending section 44 rotate as far as an angle range B (see FIG. 5) with the open angle of the first extending section 44 exceeding the angle D, the stopper 46 is completely non-adjacent to the first extending section 44.

Accordingly, in cases where the open angle of the first extending section 44 is in the range of at least the angle C but less than the angle D, that is to say in cases of the angle range A (see FIG. 5), the bearing 43 and the first extending section 44 cannot be removed in the shaft direction, but in cases where the open angle is in the range of at least the angle D, that is to say cases of the angle range B, the bearing 43 and the first extending section 44 can be removed in the shaft direction. In cases in which the open angle of the first extending section 44 is in the angle range B, it is possible to attach or remove the cover 3. Below, a method of attaching or removing the cover 3 is described.

Figure 6:
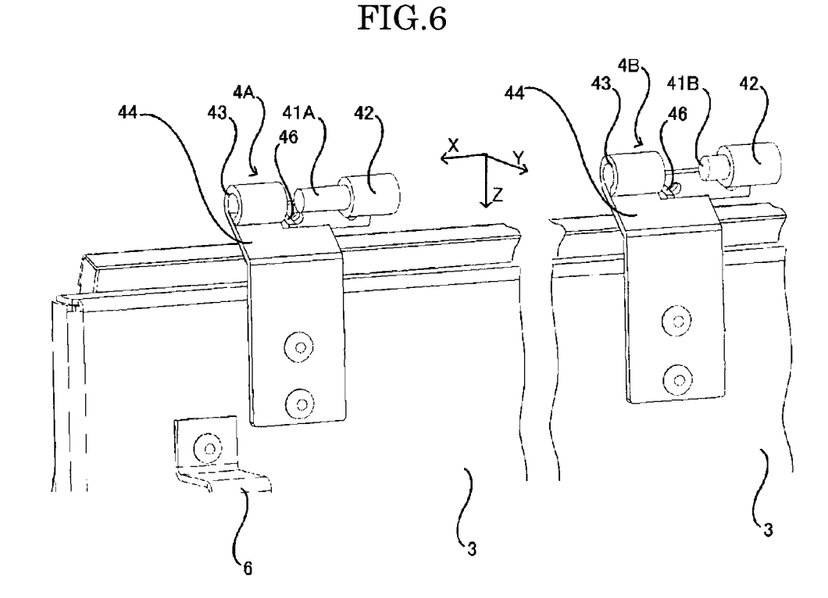
FIG. 6 is an oblique view showing the positional relationship when a shaft of the connecting member of the vehicle control apparatus is installed in a bearing.

FIG. 6 is an oblique view showing the positional relationship when the shaft of the connecting member of the vehicle control apparatus is installed in the bearing. Installing the cover 3 is accomplished by inserting the shafts 41A and 41B anchored to the housing 2 respectively into the bearing 43 connected to the cover 3.

First, the cover 3 is placed in an inclined state with respect to the housing 2 so that the cover 3 is in an opened state. At this time, the first extending section 44 is in the above-described angle range B.

In this state, of the connecting members 4A and 4B, the longer shaft, that is to say the shaft 41A, is inserted into the corresponding bearing 43. At this time, the shorter shaft 41B needs not have the position thereof lined up with the corresponding bearing 43.

Next, the shaft 41B is inserted into the corresponding bearing 43. When the shaft 41B is inserted into the bearing 43, the shaft 41A is simultaneously inserted into the corresponding bearing 43. When both are fully inserted, the cover 3 is attached to the housing 2. In this manner, the cover 3 is attached by inserting the shafts into the bearings 43 in order starting from the longer shaft. After the cover 3 is attached, when the cover 3 is put in a closed state, the cover 3 anchored to the first extending section 44 becomes in a state unable to fall from the shaft 41A because of the stopper 46. Removing the cover 3 is accomplished in the reverse order.

When the shaft 41A or 41B is inserted into the bearing 43 as described above, it is possible to incline the first extending section 44 in the angle range B using the stopper 46.

Figure 7:
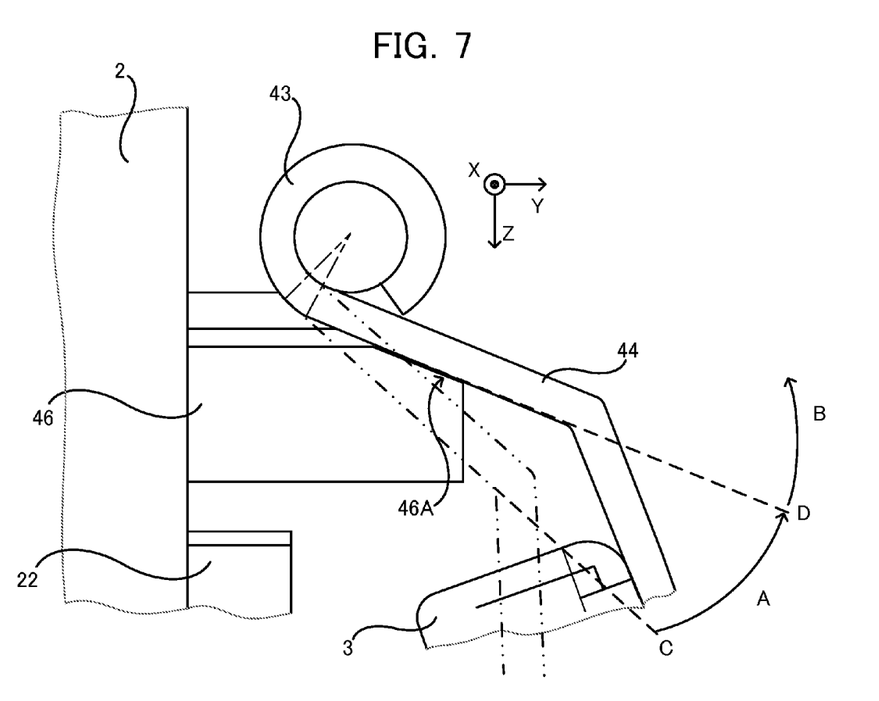
FIG. 7 is a side view showing the relationship between a stopper and a first extending section of the vehicle control apparatus.

FIG. 7 is a side view showing the relationship between the stopper and the first extending section of the vehicle control apparatus. The stopper 46 shown in FIG. 7 has the guide surface 46A formed in the plate-shaped section at the other end of the above-described stopper 46.

The guide surface 46A is formed in a shape having a surface at substantially the same orientation as the surface of the first extending section 44, in a state in which the open angle of the first extending section 44 is in the angle range B. For example, the guide surface 46A is formed at substantially the same inclination at substantially the same position as the surface (the surface on the Z-axis side shown in FIG. 7) on the cover 3 side of the first extending section 44 when the open angle of the first extending section 44 forms the angle D. Consequently, when the bearing 43 and the first extending section 44 are rotated so that the open angle of the first extending section 44 becomes the angle D, the bearing 43 is caused to move in a direction of extraction from the shaft 41A and the first extending section 44 and the stopper 46 are in a state adjacent to each other in a direction orthogonal to the shaft, the stopper 46 can support the first extending section 44 by the guide surface 46A.

In a state where the first extending section 44 is placed on the guide surface 46A and the first extending section 44 is supported by the guide surface 46A, the first extending section 44 and the stopper 46 are in a state adjacent to each other in a direction orthogonal to the shaft, so the first extending section 44 is not restricted in movement in the shaft direction by the stopper 46. Consequently, when inserting the bearing 43 onto the shaft 41A or 41B, by placing the first extending section 44 on the guide surface 46A, it is possible to incline the angle of the first extending section 44 to an angle at which insertion into the bearing 43 is possible. By placing the first extending section 44 onto the guide surface 46A and sliding the first extending section 44, thereby inserting the shafts 41A and 41B into the corresponding bearings 43, it is possible to easily attach the cover 3. Because the weight of the cover 3 is supported by the guide surface 46A, the burden on the worker is also reduced.

As described above, in the connecting members 4A and 4B that connect the housing 2 and the cover 3, by placing the cover 3 in an inclined state with respect to the housing 2 and inserting the connecting members 4A and 4B into or extracting such from the bearing 43 respectively corresponding thereto, it is possible to attach or remove the cover 3. Accordingly, compared to a conventional vehicle control apparatus (for example, when the attachment anchoring apparatus of Patent Literature 1 is used), attaching and removing the cover 3 is easier with the vehicle control apparatus 1 according to this exemplary embodiment.

The vehicle control apparatus 1 according to this exemplary embodiment is such that the first extending section 44 is disposed in a prescribed angle range (angle range A shown in FIGS. 5 and 7) with respect to the shaft supporting section 42 when the cover 3 is in a closed state with respect to the housing 2. Consequently, the stopper 46 is adjacent to the first extending section 44 in the shaft direction. At this time, the first extending section 44 and the bearing 43 are sandwiched by the shaft supporting section 42 and the stopper 46. As a result, in this vehicle control apparatus 1 the cover 3 is prevented from falling from the shaft 41A.

In addition, the vehicle control apparatus 1 according to this exemplary embodiment is such that attaching the cover 3 is easy. For example, when the vehicle control apparatus 1 is provided with multiple connecting members, if the shafts of all connecting members are the same length, it is necessary for the shafts of all connecting members to be inserted into bearings simultaneously, but with this exemplary embodiment, it is fine to insert the shafts of the connecting member 4A and 4B into the bearings 43 starting with the longer shaft. Because it is fine to insert the shafts into the bearings 43 in order from the longer shaft, attaching the cover 3 is easy. In addition, when inserting the longer shaft first, because it is possible to support the weight of the cover 3 with the long shaft, the burden on the worker is reduced.

Second Exemplary Embodiment

With the first exemplary embodiment, a configuration was described in which the bearing 43 and the first extending section 44 are connected and the shaft supporting section 42 and the stopper 46 are connected, but a configuration in which the bearing 43 and the shaft supporting section 42 are transposed would also be fine.

Figure 8:
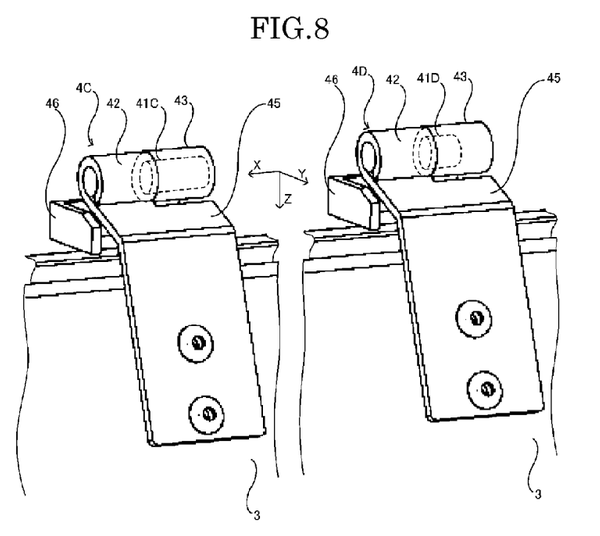
FIG. 8 is an oblique view showing a variation of the connecting members of the vehicle control apparatus.

FIG. 8 is an oblique view showing a variation of the connecting members of the vehicle control apparatus. With connecting members 4C and 4D shown in FIG. 8, the shafts 41C and 41D are anchored to the shaft supporting section 42 and the shaft supporting section 42 supports the shaft 41C and 41D, and the shaft supporting section 42 is connected to the second extending section 45. The bearing 43 is connected to the stopper 46.

The shaft 41C has a longer shaft length than the shaft 41D, and the shafts 41C and 41D are respectively inserted into the bearing 43.

The bearing 43 is a cylindrically shaped member and supports the shafts 41C and 41D. A housing anchoring section is provided to the side surface of the cylinder and through this the bearing 43 is anchored to the housing 2. The bearing 43 is adjacent to the shaft supporting section 42 in the shaft direction.

The shaft supporting section 42 is formed integrally with a second extending section 45 and is anchored to the cover 3. For example, the shaft supporting section 42 is formed by a plate-shaped member (for example, sheet metal), similar to the bearing 43 and the first extending section 44 of the first exemplary embodiment. The cylindrically shaped shaft supporting section 42 bent and formed so as to encompass the shafts 41C and 41D is disposed at one end, and at the other end, the second extending section 45 protruding from the cylindrically shaped shaft supporting section 42 is disposed. The protruding portion is planar, with the tip thereof bent and a screw hole for anchoring to the cover 3 formed therein. The second extending section 45 is adjacent to the stopper 46 when the cover 3 is in a closed state.

The shape and position of the stopper 46 are the same as in the first exemplary embodiment. One end of the stopper 46 is anchored to the housing 2 and is connected to the bearing 43 via the housing 2. The other end of the stopper 46 is adjacent to the second extending section 45 in the shaft direction when the cover 3 is in a closed state, and moreover, is not adjacent to the second extending section 45 when the cover 3 is in an opened state.

Accordingly, even in the vehicle control apparatus 1 using this variation of the connecting members 4C and 4D, it is possible to attach and remove the cover 3 when the cover 3 is in an inclined state with respect to the housing 2. In addition, when the cover 3 is in a closed state with respect to the housing 2, the cover 3 is prevented from falling from the bearing 43.

Third Exemplary Embodiment

In the above-described exemplary embodiments, cases in which there are two connecting members for one cover 3 are explained, but this number is arbitrary. For example, it would be fine for the vehicle control apparatus 1 to be provided with one cover 3 and for the cover 3 and the housing 2 to be connected by three or more connecting members. In this case, it would be fine for the connecting members of the above-described exemplary embodiment to be disposed on both ends of the cover 3.

Figure 9:
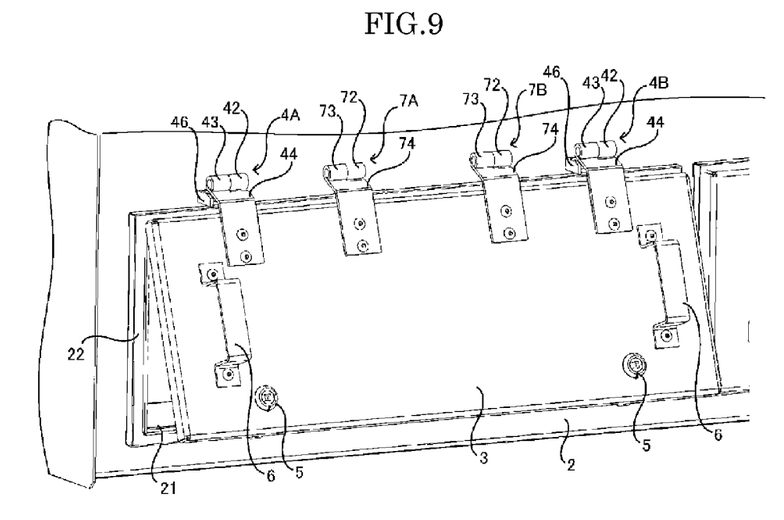
FIG. 9 is an oblique view showing a variation of the cover of the vehicle control apparatus.

FIG. 9 is an oblique view showing a variation of the cover of the vehicle control apparatus. Connecting members 4A, 7A, 7B, and 4B are disposed so as to line up in a horizontal direction as though following the top edge of the cover 3 shown in FIG. 9, and these connecting members connect the housing 2 and the cover 3. Each of the shafts of the connecting members 4A, 7A, 7B and 4B is disposed substantially collinearly. The connecting members 4A and 4B are disposed at both ends of the above-described edge.

The connecting members 4A and 4B are the same connecting members as the connecting members of the above-described exemplary embodiments, and the connecting members 7A and 7B are connecting members each provided with a shaft supporting section 72, a bearing 73 and a third extending section 74 but not provided with a stopper 46. The connecting members 4A and 4B provided with stoppers 46 are disposed at both ends of the above-described edge, and the connecting members 7A and 7B not provided with stoppers 46 are disposed to the inside thereof.

The shafts that the connecting members 7A and 7B have are of the same length as the shaft 41B of the connecting member 4B of the above-described exemplary embodiment. Of the various connecting members 4A, 7A, 7B and 4B, the shaft of the connecting member 4A is longer than the shafts of the other connecting members.

With this kind of vehicle control apparatus 1, the shafts may be inserted into the bearings 43 and 73 in order from the longest shaft, so attaching the cover 3 is easy.

As long as at least one out of the connecting members 4A and 4B is present, it is possible to prevent the cover 3 from falling, but as in the above-described exemplary embodiment, when the connecting members 4A and 4B are disposed at both ends of the cover 3, in comparison to the case in which these members are disposed in the center, it is more difficult for falling of the cover 3 to occur even if a force is applied to the cover 3 so as to move the two ends of the side supporting the cover 3 in differing directions.

Figure 10:
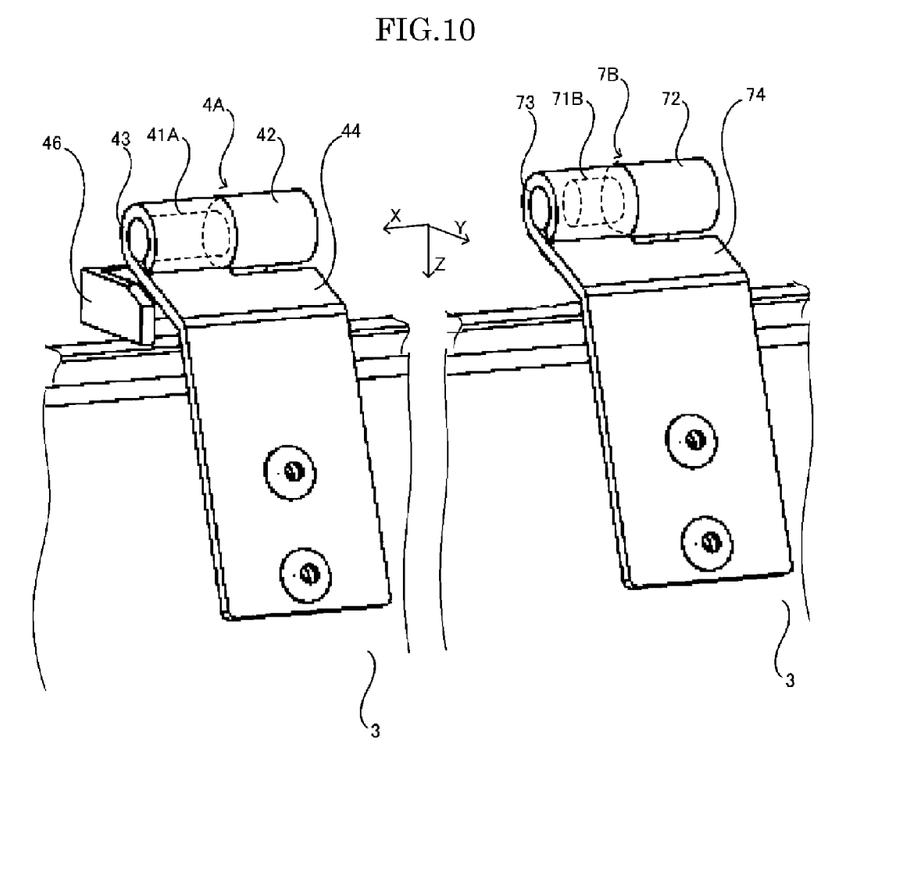
FIG. 10 is an oblique view showing a variation of combination of the connecting members used in the vehicle control apparatus.

FIG. 10 is an oblique view showing a variation of combination of the connecting members used in the vehicle control apparatus. The combination of connecting members shown in FIG. 10 is a combination of the connecting member 7B provided with the shaft supporting section 72, the bearing 73 and the third extending section 74 but not provided with the stopper 46, and the connecting member 4A of the above-described exemplary embodiment. The shaft 71B of the connecting member 7B is the same length as the shaft 41B of the connecting member 4B, and is shorter than the shaft 41A of the connecting member 4A.

Because the connecting member 4A is provided even when this combination of connecting members is applied to the vehicle control apparatus 1, it is possible to prevent falling of the cover 3 and also make it possible to easily attach and remove the cover 3.

Various variations of all of the above-described exemplary embodiments are possible within the scope of the present disclosure. The above-described exemplary embodiments describe the present disclosure but are intended to be illustrative and not limiting.

For example, in the above-described exemplary embodiments, the cylindrically shaped member supporting the shaft in an anchored state was described as the shaft supporting section 42 and the cylindrically shaped member supporting the shafts 41A and 42B so as to be insertable and removable was described as the bearing 43, but these were for convenience and to facilitate understand of the disclosure. The shaft supporting section 42 and the bearing 43 are both supporting members for supporting the shafts 41A and 41B, and may be called supporting sections. For example, it would be fine for the shafts to be insertable into and removable from the shaft supporting section 42 and for such to be called a supporting section. In addition, in the present disclosure it matters not if either the shaft supporting section 42 or the bearing 43, or both of these, is such that the shaft is insertable and removable. In addition, it matters not if either the shaft supporting section 42 or the bearing 43, or both of these, rotatably supports the shafts 41A and 41B. For example, it would be fine if the shaft supporting section 42 rotatably supported the shafts 41A and 41B but did not allow insertion and removal of the shafts.

In addition, in the above-described exemplary embodiment, the explanation was of a configuration in which the shaft supporting section 42 and the bearing 43 are formed separately from the shafts 41A and 41B, but the present disclosure is not limited to this. Either of the shaft supporting section 42 and the bearing 43 may be integrally formed with the shafts 41A and 41B. For example, it would be fine to have a structure with the shaft supporting section 42 and the shaft 41A integrally formed by shaving metal materials. In this manner, the connection configuration of the shafts 41A and 41B and either the shaft supporting section 42 or the bearing 43 is not limited to that of the above-described exemplary embodiments.

In addition, in the above-described exemplary embodiments, the shaft supporting section 42 and the bearing 43 were described as being cylindrical in shape, but the shapes of the shaft supporting section 42 and the bearing 43 are not limited to this.

In the above-described exemplary embodiments, an embodiment of the cover 3 that covers the opening 21 provided in the side surface of the housing 2 was described, but the present disclosure may also be applied to a vehicle control apparatus 1 provided with a housing 2 which is disposed on the bottom of the floor of a vehicle and in which an opening 21 is provided on the bottom surface side, and a cover 3 covering this opening 21. In addition, the present disclosure may be applied to a vehicle control apparatus 1 provided with a housing 2 which is disposed on top of the roof and in which an opening 21 is provided on the top surface side, and a cover 3 covering this opening 21.

In the above-described exemplary embodiment, the description was of a configuration in which the connecting members 4A and 4B or 4C and 4D are disposed on the edge of the top side of the cover 3, but it would be fine for the connecting members 4A and 4B or 4C and 4D to be disposed on the edge of the bottom side or an edge in the sideways direction.

In the above-described exemplary embodiment, the description was of a configuration in which the stopper 46 and the shaft supporting section 42 are anchored via the housing 2, but it would be fine for the stopper 46 to be directly anchored to the shaft supporting section 42 in an embodiment. For example, it would be fine for the shaft supporting section 42 to be anchored on the side surface of the cylinder of the shaft supporting section 42, and it would be fine for the shaft supporting section 42 and the stopper 46 to be integrally formed.

It should be understood that the scope and spirit of the present invention is indicated by the appended claims rather than the embodiment. Various changes and modifications within the limitations in the claims and the equivalent thereto are also included in the scope and spirit of the present invention.

REFERENCE SIGNS LIST

1 Vehicle control apparatus
2 Housing
21 Opening
22 Framework
3 Cover
4A, 4B, 4C, 4D Connecting member
41A, 41B, 41C, 41D Shaft
42 Shaft supporting section
42A Housing anchoring section
43 Bearing
44 First extending section
45 Second extending section
46 Stopper
46A Guide surface
5 Latch
6 Handle
7A, 7B Connecting member
71B Shaft
72 Shaft supporting section
73 Bearing
74 Third extending section

The invention claimed is:

1. A vehicle control apparatus comprising:
a housing mounted on a vehicle to house the vehicle control apparatus for controlling the vehicle;
a cover to cover an opening formed in the housing; and
at least one connecting member to connect the cover and the housing so as to enable opening and closing of the opening by the cover;
wherein
the connecting member comprises:
a first supporting section to support a shaft, the first supporting section being connected to either the housing or the cover;
a second supporting section to support the shaft, the second supporting section being adjacent to the first supporting section in the direction of the shaft; and
an extending section extending from the second supporting section in a direction orthogonal to the shaft and being connected to other of the housing or the cover;
wherein
at least one out of the first supporting section and the second supporting section rotatably supports the shaft, and the extending section and the second supporting section are rotatable with respect to the first supporting section;
at least one out of the first supporting section and the second supporting section enables insertion and removal of the shaft; and
comprises a stopper that is not adjacent to the extending section in the direction of the shaft when the extending section is in a first angle range with respect to the first supporting section in a state in which the shaft is inserted into at least one out of the first supporting section and the second supporting section and the first supporting section and the second supporting section are adjacent, and is disposed at a position adjacent to the extending section in the direction of the shaft and sandwiches, with the first supporting section, the extending section in the direction of the shaft, when the extending section is in a second angle range with respect to the first supporting section.

2. The vehicle control apparatus according to claim 1, wherein:
the at least one connecting member comprises a plurality of connecting members for the single cover; and
among the plurality of connecting members, the shaft of at least one of the connecting members is longer than the shaft of any of the other connecting members.

3. The vehicle control apparatus according to claim 1, wherein:
when the cover closes the opening, an angle formed by the extending section with respect to the first supporting section is not included in the first angle range; and
when the cover closes the opening, the angle formed by the extending section with respect to the first supporting section is included in the second angle range.

4. The vehicle control apparatus according to claim 1, wherein:
the stopper is formed in a shape supporting the extending section in a state in which the extending section forms a prescribed angle with respect to the first supporting section and either one of the first supporting section or the second supporting section moves in a direction extracting the shaft and the extending section and the stopper are adjacent in a direction orthogonal to the shaft; and
the prescribed angle is included in the first angle range.

5. The vehicle control apparatus according to claim 4, wherein:
the extending section has a planar plate-shaped section; and
the stopper is formed in a shape having a planar surface parallel to the plate-shaped section in a state in which the extending section forms the prescribed angle with respect to the first supporting section.

6. The vehicle control apparatus according to claim 1, wherein:
the at least one connecting member comprises a plurality of connecting members for the single cover; and
the shafts of the plurality of connecting members are disposed so as to be lined up collinearly in a horizontal direction.

7. The vehicle control apparatus according to claim 1, further comprising:
   with respect to the single cover, at least a total of two or more of:
   the connecting member; and
   another connecting member possessing the first supporting section, the second supporting section and the extending section and not possessing the stopper;
   wherein of at least two or more, in total, connecting members and the other connecting members, at least one of the shafts is longer than the shafts of the other connecting members.

\* \* \* \* \*